United States Patent
Watts

[15] 3,655,216
[45] Apr. 11, 1972

[54] VEHICLE STABILIZER

[72] Inventor: Carlos R. Watts, 1149 S.E. 20, Oklahoma City, Okla. 73129

[22] Filed: July 31, 1970

[21] Appl. No.: 60,017

[52] U.S. Cl. ..........................................280/150 D
[51] Int. Cl. ..........................................B60r 27/00
[58] Field of Search ...............................280/150 D

[56] References Cited

UNITED STATES PATENTS

| 3,565,457 | 2/1971 | James | 280/150 D |
| 2,618,492 | 11/1952 | Singer | 280/150 D |
| 2,797,931 | 7/1957 | Hans | 280/150 D |

*Primary Examiner*—Benjamin Hersh
*Assistant Examiner*—Robert R. Song
*Attorney*—Robert K. Rhea

[57] ABSTRACT

A vehicle stabilizing apparatus for connection with an automobile, or the like, for reducing the vehicle skidding and dampening vibration. An elongated casing having closed ends is transversely mounted on the automobile. The casing contains a mass of inertia of less length than the case and freely movable between its ends. Resilient means interposed between the respective ends of the case and the mass transfer a force, produced by the inertia of the mass resisting lateral movement of the case to the respective end of the case in a direction opposite the direction of lateral movement of the automobile.

5 Claims, 5 Drawing Figures

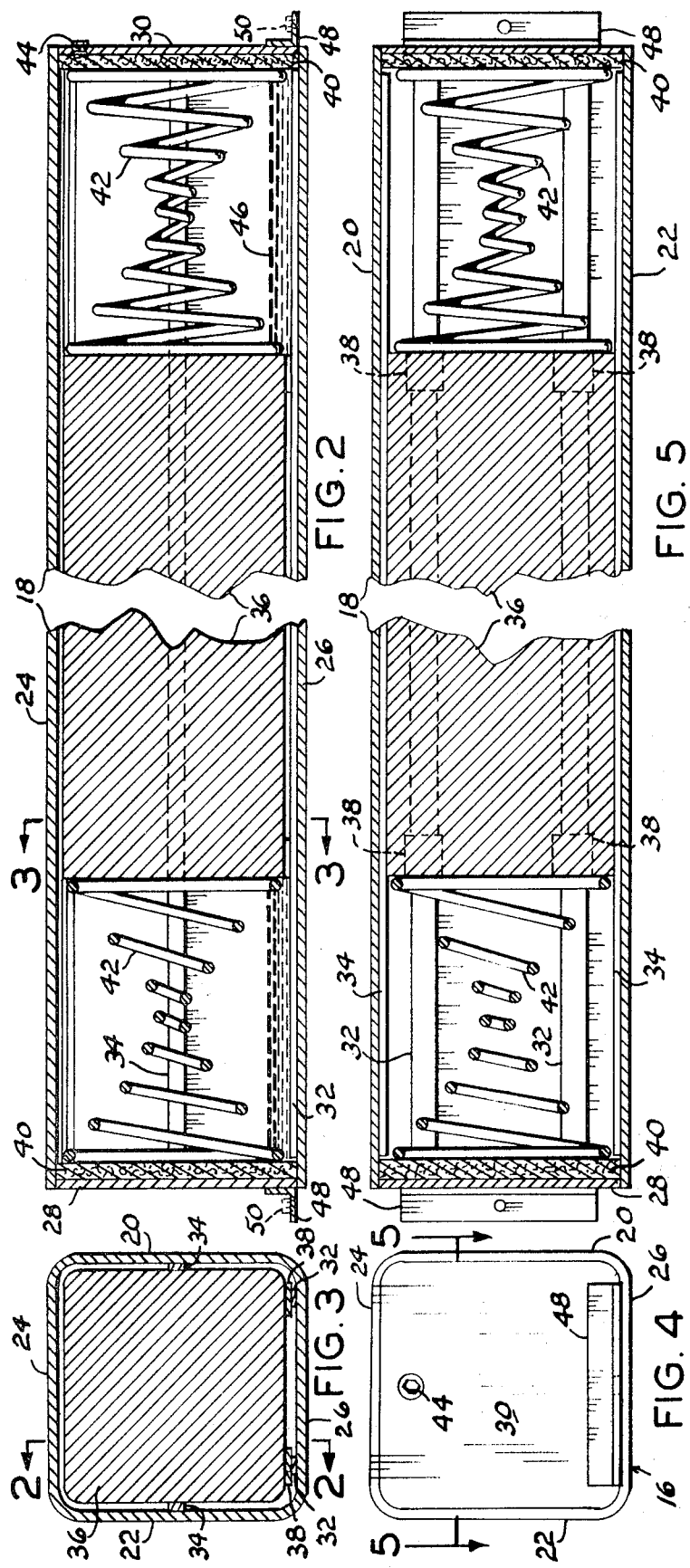

VEHICLE STABILIZER

BACKGROUND OF THE INVENTION

1. Field of the invention

The present invention relates to a vehicle stabilizer for reducing vehicle skidding and dampening its vibrations.

Vehicles, such as automobiles, and the like, tend to skid when the centrifugal force, produced by turning a curve or by turning one pair of its wheels sharply in one direction or the other and overcomes the frictional resistance between the tires and the roadway surface. The friction resisting skidding action varies in accordance with the coefficient of friction between the tire treads and road surface. This coefficient of friction varies with the particular road surface in accordance with the condition of the road surface whether it be dry or lubricated as by being wet or covered with ice, snow, or the like. Furthermore, the coefficient of friction between tire treads and a road surface varies or is reduced for short periods of time as a result of vibration either of the vehicle chassis or an imbalance of a tire or wheel wherein such reduction in the coefficient of friction results in a culumative effect of other forces tending to induce a skidding action. This stabilizer acts to prevent or reduce a tendency of a vehicle to skid by a novel combination of its components which is quick and positive in action and yet is simple and relatively inexpensive in manufacture.

2. Description of the prior art.

The prior art teaches vehicle stabilizers such as U.S. Pat. Nos. 2,155,130; 2,701,144 and 2,797,931, which employ a mass mounted for movement laterally of the direction of travel of the vehicle so when the vehicle starts to skid the mass tends to remain stationary and apply its force to its mounting means and thus resist the transverse movement of the vehicle. Stabilizer devices disclosed by the prior art usually consist of a cylindrical mass contained by a hollow cylinder with a spring each end of the mass tending to center the mass under normal operation and transferring the force produced by the mass to the respective end of the hollow cylinder and thus to the vehicle.

Various means have been used by some of these prior patents to reduce the frictional resistance between the mass and its surrounding cylinder, such as mounting the mass on a rod projecting coaxially through the cylinder and mass including bearings, for supporting the mass on the rod, as shown by U.S. Pat. No. 2,635,898 while other patents such as U.S. Pat. No. 2,633,368 which discloses filling the cylinder with a lubricating fluid and centrally drilling the mass to prevent compression of the fluid on either side thereof. One disadvantage of these prior art stabilizers is that for a given amount of space the mass is reduced by its circular cross-section shape thus requiring an overall larger unit. Furthermore, hollow cylinders tend to develope uneven areas in their surfaces which hinders the mass movement. It has also been suggested, as disclosed by U.S. Pat. Nos. 2,990,193 and 3,436,648, to suspend a mass between pairs of links to allow the mass to swing freely back and forth laterally of the vehicle in pendulum fashion. This results in a stabilizing effect but is inefficient for the reason that the resulting force vector is angled downward from the desired horizontal direction thereby wasting some of the inherent capabilities of the stabilizer.

SUMMARY OF THE INVENTION

An elongated rectangular hollow case is transversely secured to a vehicle. The case contains a mass inertia normally centered intermediate its ends by resilient members interposed between the respective ends of the case and the mass. Antifriction means within the case permits freedom of movement of the case relative to the mass.

The principal object of this invention is to provide a sturdily constructed, quick acting, simple and relatively inexpensive vehicle stabilizer having means permitting a maximum distance of movement of the mass relative to its containing case.

BRIEF DESCRIPTION OF THE DRAWINGS

FIG. 1 is a fragmentary perspective view of the device installed within the trunk portion of an automobile;

FIG. 2 is a longitudinal vertical cross-sectional view of the device taken substantially along the line 2—2 of FIG. 3;

FIG. 3 is a vertical cross-sectional view taken substantially along the line 3—3 of FIG. 2;

FIG. 4 is a right end elevational view of FIG. 2; and,

FIG. 5 is a horizontal cross-sectional view taken substantially along the line 5—5 of FIG. 4.

DESCRIPTION OF THE PREFERRED EMBODIMENTS

Like characters of reference designate like parts in those figures of the drawings in which they occur.

In the drawings:

The reference numeral 10 indicates a vehicle body, as a whole, having a rearward trunk compartment 12 including a bottom surface or floor 14 on which the stabilizer, indicated at 16, is positioned adjacent the rearward limit of the compartment 12 and transverse to the longitudinal axis of the vehicle 10. The stabilizer 16 comprises an elongated casing 18 substantially square in cross section. The length of the casing 18 and its cross sectional dimensions may be varied in accordance with the mass of the vehicle to which it is to be attached, for example, a casing 30 inches long and 4 inches square is satisfactory for most compact or small passenger automobiles whereas a casing 36 inches long and 5 inches square operates satisfactorily when attached to larger automobile or light weight pick-up trucks. When the stabilizer is mounted on a pick-up truck it is mounted in a similar manner in either on, or under the rearward limit of the truck bed, not shown. The casing is defined by opposing side walls 20 and 22, integrally joined to a top 24 and a bottom wall 26. The respective ends of the casing are closed by end plates 28 and 30 so that the casing 18 is fluid-tight for the purposes presently apparent.

A pair of strap-like guides or tracks 32, substantially coextensive with the longitudinal length of the casing 18, are positioned in parallel spaced-apart relation and connected to the inner surface of the bottom wall 26. Similarly, a pair of strap-like guides 34 are longitudinally secured to the inner surface of the side walls 20 and 22, respectively, intermediate their vertical height. A substantially rectangular block or weight 36, having less cross-sectional and longitudinal dimensions than the inside dimensions of the casing, is placed therein prior to assembling the end plates 28 and 30. For example, I have found that a 3 inch square by 15 inch long weight operates satisfactorily within the 30 inch case while a 4 inch square block 20 inches long is preferred for the longer case. The mass of the weight 36 is preferably equal to or greater than 1 percent of the weight of the vehicle to which the stabilizer is to be connected.

Support plates 38, substantially square in plan view (FIG. 5) and having a transverse dimension slightly greater than the transverse dimension of the track 32, are secured to the respective depending corner portions of the lowermost surface of the weight 36 for cooperatively overlying the respective tracks 32 and reducing the area of contact between the weight 36 and the tracks 32. For convenience in manufacture I have found that the guides 34 may be eliminated and similar support plates may be secured to opposing sides of the weight 36, at the position of the guides 34, to reduce the area of contact between the weight and the casing side walls.

A sound deading recoil pad 40, preferably at least one-half inch thick and having transverse dimensions closely received by the inner surface dimensions of the respective end portions of the casing, formed of resilient material, such as felt, or the like, is positioned in contiguous contact with the inner surface of the respective end plate 28 and 30.

A helical compression spring 42 is interposed between the respective end portion of the weight 36 and pad 40. The purpose of the springs 42 is to normally maintain the weight substantially centrally positioned between the casing ends. The springs 42 are characterized by their respective end coil or convolution being freely received within the boundries of the vertical surfaces presented by the respective ends of the weight 36 and adjacent surface of the pad 40. The springs converge or taper toward their medial portion thus substantially forming an hourglass shape when viewed in side elevation. The purpose of forming these springs 42 in a double spiral manner is so that they may substantially collapse within themselves in response to the mass of the weight 36 when bearing against one end portion of the respective spring thus permitting a maximum distance of travel of the weight within the casing when the casing is displaced longitudinally of the casing by a skidding movement of the vehicle.

The end plate 30 is provided with an aperture closed by a plug 44 through which a quantity of lubricant is poured into the casing after it is assembled as described hereinabove. The lubricant preferably comprises a quantity of lubricating oil, for example, two quarts of motor oil mixed with one quart of an oil conditioner having the properties of reducing the surface tension of the lubricating oil, such as a product presently marketed under the tradename of Mystic and commonly known as half and half oil conditioner. Apertured angle iron brackets 48 are secured to the outer surface of the depending edge portion of the respective end plate 28 and 30 for receiving bolts 50, or the like, for connecting the stabilizer to the vehicle trunk floor 14.

Obviously the invention is susceptible to changes or alterations without defeating its practicability, therefore, I do not wish to be confined to the preferred embodiment shown in the drawings and described herein.

I claim:

1. A vehicle stabilizer, comprising:
a horizontally disposed elongated rectangular casing having end closing plates;
bracket means secured to said end plates for transversely connecting said stabilizer to a vehicle;
a rectangular weight loosely received by said casing, the length of said weight being not less than one-half the length of said casing;
weight supporting tracks coextensive with and longitudinally secured to said casing in parallel spaced relation;
a support plate secured to the respective lower surface corner portion of said weight in overlying relation with respect to said tracks; and,
a helical spiral spring interposed between the respective end of said weight and said casing ends.

2. The stabilizer according to claim 1 in which said springs define a double helical spiral joined at their apexes to define an hourglass shape.

3. The stabilizer according to claim 2 and further including:
guide means within said casing on opposing sides of said weight, 4. The stabilizer according to claim 3 and further including:
a resilient pad interposed between the respective end of said casing and the adjacent end of each said spring.

5. The stabilizer according to claim 4 and further including:
lubricant within said casing in quantity sufficient to cover said tracks and insufficient to hamper movement of said weight.

* * * * *